United States Patent [19]

Saxod et al.

[11] Patent Number: 5,009,742
[45] Date of Patent: Apr. 23, 1991

[54] METHOD AND APPARATUS FOR MAKING SEALING RINGS OF THE RADIAL TYPE WITH SEALING LIP OF FLUOROPLASTIC

[76] Inventors: Michel Saxod, Bourg, 52200 Langres; Fabrice Fougerolle, Montlandon, 52600 Chalindrey, both of France

[21] Appl. No.: 475,873

[22] Filed: Feb. 6, 1990

Related U.S. Application Data

[62] Division of Ser. No. 311,791, Feb. 17, 1989, abandoned.

[30] Foreign Application Priority Data

Feb. 18, 1988 [FR] France ................... 88 01929

[51] Int. Cl.⁵ .................. B44C 1/22; B29C 37/00; C03C 15/00; C03C 25/06
[52] U.S. Cl. ................................. 156/633; 156/654; 156/668; 156/345
[58] Field of Search ............... 156/629, 633, 654, 655, 156/659.1, 668, 345

[56] References Cited

U.S. PATENT DOCUMENTS 3,205,113  9/1965  McFarland ............... 156/668 X
4,855,018  8/1989  Leonard et al. ........... 156/668 X Primary Examiner—William A. Powell

[57] ABSTRACT

The invention relates to a sealing ring of the radial type comprising a reinforcement, a body, particularly of elastomer, and a sealing lip consisting of an annular washer, of fluoroplastic such as PTFE, made to adhere along an outside peripheral annular zone by one of its faces on an upper bearing surface of the body.

The washer is subjected to a chemical attack treatment aimed at reducing its antiadhesive properties only over an outside annular peripheral zone, the radial area of the outside zone corresponding to the radial area of the upper bearing surface of the elastomer body of a ring on which the sealing lip is made to adhere.

4 Claims, 2 Drawing Sheets

METHOD AND APPARATUS FOR MAKING SEALING RINGS OF THE RADIAL TYPE WITH SEALING LIP OF FLUOROPLASTIC

This application is a division of application Ser. No. 311,791, filed Feb. 17, 1989, now abandoned.

This invention relates to sealing rings of the radial type and more particularly to such rings comprising a reinforcement, a body, particularly an elastomer, and a sealing lip of material with slight friction, particularly of fluoroplastics such as, in particular, polytetrafluoroethylene (PTFE), with or without filler, made to adhere to said body and projecting radially inward from it.

Such rings can also comprise a secondary dust-proof lip, made of the same material as the body and extending it, as well as a coating of the same material on the bearing surface of the reinforcement resting on the bearing surface of the bore in which the ring is placed.

An embodiment of such rings and a process of producing them by injection molding of the elastomer body are described in French patent application 85 11007 of the applicant company.

In such sealing rings, the sealing lip consists of an annular washer, of fluoroplastic such as PTFE, made to adhere along an outside peripheral annular zone by one of its faces on an upper bearing surface of the body.

In practice, before being placed in the mold for making the ring, the fluoroplastic washer, particularly made of PTFE, is treated by chemical attack in a way known, for example, from German patent application 33 29 386, to increase its aptitude for adhesion, then generally is glued to the face of its outside peripheral annular zone intended to be made to adhere to the elastomer body.

The treatment aimed at reducing the antiadhesive properties of the PTFE consists in chemically eliminating the fluorine atoms present in the chains of the surface layers and which ordinarily give the PTFE antiadhesive properties used in other applications.

For this purpose, the annular PTFE washers intended to make the sealing lip, previously preformed or machined to the desired shape, particularly to exhibit an end excess thickness and/or the desired hydrodynamic pumping means, particularly orientation striae, are immersed in a treatment bath, particularly sodium/ammonia, for several seconds, then washed, rinsed and dried.

Thus, the entire washer is treated, in particular its radially inside annular part, intended to form the sealing active bearing surface on the shaft.

Now, tests made by the applicant company have shown that the transformation of surface topography of the washer caused particularly at the level of the active bearing surface of the sealing lip during antiadhesion chemical attack treatment had detrimental consequences on the quality and reliability of the sealing lip, in particular in its dynamic sealing zone, causing a deterioration of the latter.

This invention particularly has the object of avoiding this drawback.

For this purpose, according to the invention, the fluoroplastic washer, particularly of PTFE, forming the sealing lip is subjected to a treatment by chemical attack aimed at reducing its antiadhesive properties only on an outside annular peripheral zone, the radial area of said outside zone corresponding to the radial area of the upper bearing surface of the elastomer body of the ring on which the sealing lip is made to adhere.

Preferably, the radial area of the annular zone of the washer treated by chemical attack is between 20 and 80% of the radial width of said washer.

The treatment by chemical attack can be performed only on the face of the washer opposite the elastomer body or on both faces of the latter.

The fact of treating the face of the washer opposite that made to adhere to the elastomer body and only on an outside peripheral annular zone of the washer not participating in the sealing function of the lip in contact with the shaft actually has not been shown to be harmful for the functioning of the ring.

The operations of treatment by chemical attack can be performed by any suitable means making possible a selective chemical attack in the specified zone, excluding the rest of the washer.

For this purpose, there can be cited the standard techniques of silk-screening or pad application or also deposit by centrifuging.

For economic reasons of production rates, it is proposed according to the invention to perform the chemical attack by immersing in a bath of a suitable, particularly sodium/ammonia, solution, a unit comprising a stack of washers strung on a central shaft, said washers being separated by annular spacing elements, also strung on a central shaft, and locked, said elements having a diameter corresponding to the diameter of the zone of the washer intended to be protected from the chemical attack.

After immersion of the unit, thus constituted, in which only the washer zones to be treated are in contact with the chemical attack solution, the unit is removed and the standard operations of washing, rinsing and drying of the washers are performed for subsequently making the rings.

To give a better understanding of the invention, an embodiment will now be described by way of example that is in no way limiting with reference to the accompanying drawing in which.

Figure 1:
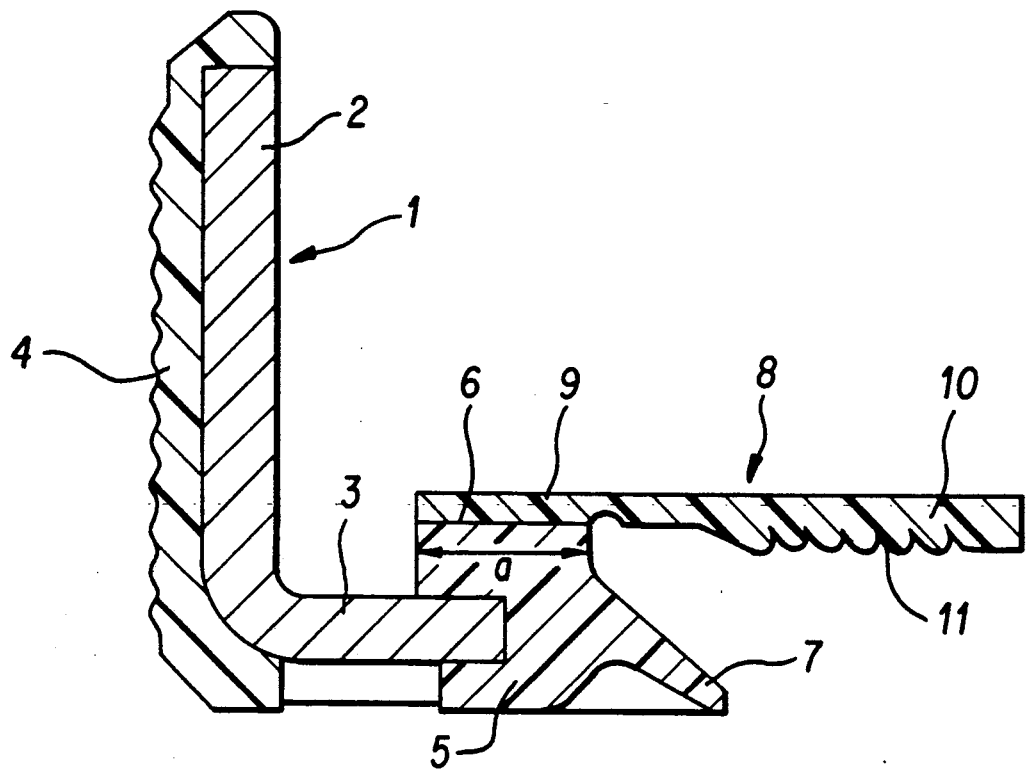
FIG. 1 represents, in semisection, a ring according to the invention.
Figure 2:
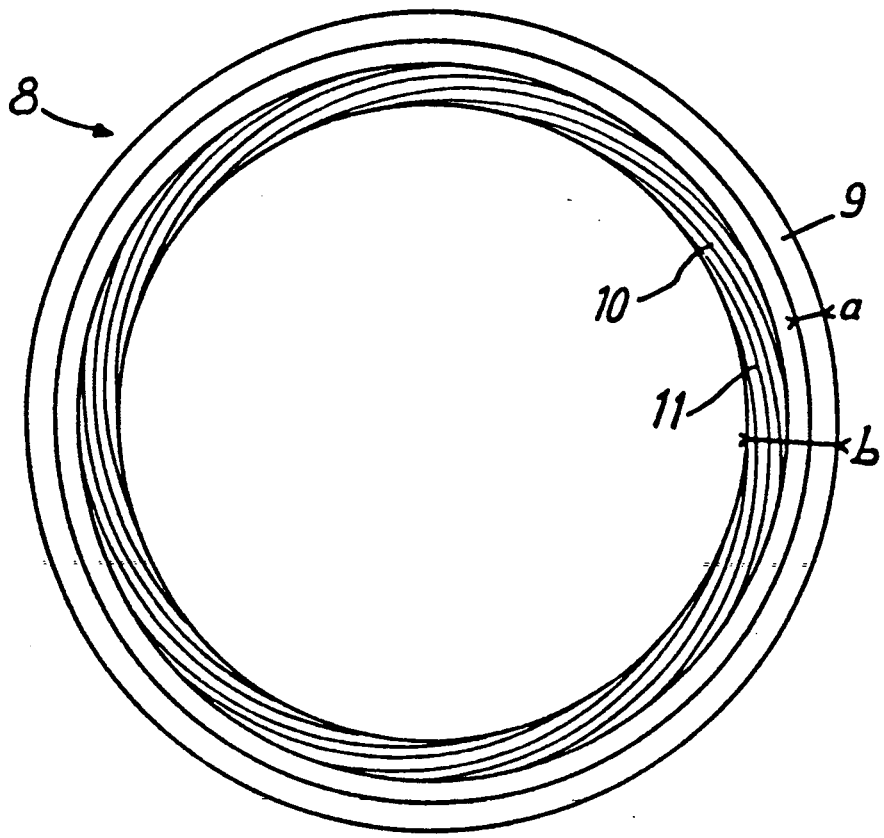
FIG. 2 is a bottom view of a washer constituting the sealing lip of the ring according to the invention.

The ring according to the invention, illustrated in FIG. 1, is of the same type as that described in French patent application 85 11007 of the applicant company.

The ring comprises a metal annular reinforcement 1, exhibiting a long branch 2 intended to come to rest against the wall of the bore (not represented), in which the ring is mounted, and a shorter radial branch 3. An elastomer coating 4, constituting the outside bearing surface of the ring, is made to adhere in a standard way to long branch 2 of the reinforcement.

An elastomer body 5, exhibiting a plane upper bearing surface 6 with radial area a, is made to adhere to branch 3 of reinforcement 1.

Body 5 also comprises an extension 7, all in one piece, constituting a dust-proof secondary lip.

The ring comprises a sealing lip consisting of an annular washer 8 made of fluoroplastic such as PTFE, made to adhere by an outside peripheral annular zone 9 with a radial area a to upper bearing surface 6 of the body, the sealing lip extending beyond body 5 and exhibiting a radially inside sealing active bearing surface 10, in the shape of the excess thickness in the example illustrated and comprising, in the face intended to come in contact with the shaft (not represented), orientation striae 11 able to achieve a hydrodynamic pumping effect.

According to the invention, washer 8 is subjected to a chemical attack treatment to reduce its antiadhesive properties only on annular peripheral zone 9 of radial area a and not over the entire surface of the washer and in particular not in sealing active part 10.

In one embodiment, a PTFE washer with an outside diameter of 98 mm, a radial width b of 11 mm, was treated over a zone of radial area a of 4 mm.

Figure 3:
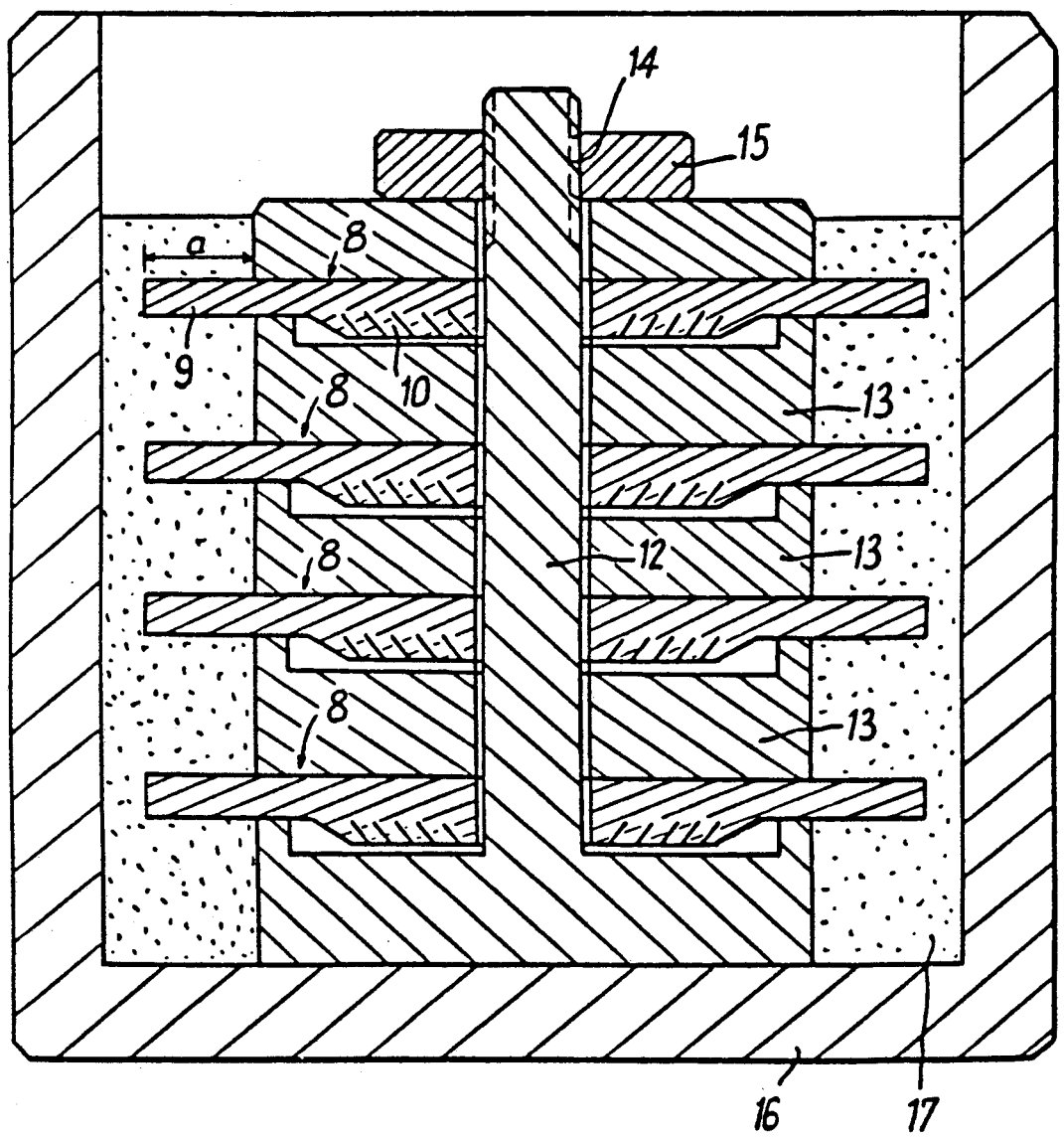
FIG. 3 shows, diagrammatically in section, an example of use of the process of chemical attack treatment to make the washer illustrated in FIG. 2.

The treatment was performed on both faces of the washer in outside annular zone 9 of radial area a by using the device illustrated in FIG. 3 in which the washers are stacked on a central shaft 12 with interposition of annular spacing elements 13 also strung on shaft 12 and able to mask the surfaces of the washers except for the surfaces of outside peripheral annular zones 9. Shaft 12 comprises at its end a threaded part 14 on which a locknut 15 is screwed.

The unit thus made is placed in a tank 16 containing a chemical attack treatment liquid 17 into which only parts 9 of the washers are immersed.

After immersion for a period on the order of several seconds, washers 8 are removed from the tank, washed, rinsed and dried.

The further operation of molding to make the ring can be advantageously performed by using the process described in said French patent application 85 11007, after optional gluing of the washers on the face of their outside peripheral annular zone that is to be made to adhere to the elastomer body.

Other production processes, particularly compression molding of the elastomer body, can also be used by using a fluoroplastic washer, treated as specified in this application.

Although the invention has been described in connection with a particular embodiment, it is quite obvious that it is in no way limited to it and that different variants and modifications can be made to it without thereby going outside its scope or spirit.

We claim:

1. A method of making a sealing ring of the radial type, having a reinforced elastomeric body and an annular sealing ring in the form of an annular fluoroplastic washer adhered to a mating surface on the elastomeric body, comprising steps of
    subjecting only an outer peripheral portion, corresponding in size to said mating surface, of the annular ring to chemical attack, while protecting an inner peripheral portion thereof from attack, to reduce the antiadhesive properties of the washer only over said outer peripheral portion, and then
    adhering said washer to the mating surface of said body.

2. An apparatus for treating an outer peripheral portion of a fluoroplastic sealing ring with a chemical liquid to reduce antiadhesive properties of the outer peripheral portion, while protecting an inner portion of the ring from chemical attack, comprising
    a tank for containing the chemical liquid,
    a shaft supported on a surface of said tank, said shaft having a diameter smaller than the inner diameter of said sealing ring,
    at least two annular spacing elements having an inner diameter larger than said shaft diameter, and an outer diameter less than that of said sealing ring, whereby said washers may serve as masks for an inner annular portion of said sealing ring when assembled on either side thereof, and
    means for applying an axial compressive force to said spacing elements.

3. The invention of claim 2, wherein said shaft has a threaded portion, and wherein said compressive force applying means comprises a nut which can be tightened upon said threads.

4. The invention of claim 2, wherein said spacing elements are at least three in number, so that more than one sealing element can be treated at one time in the tank.

* * * * *

UNITED STATES PATENT AND TRADEMARK OFFICE
CERTIFICATE OF CORRECTION

PATENT NO. : 5,009,742

DATED : April 23, 1991

INVENTOR(S) : Saxod et al

It is certified that error appears in the above-identified patent and that said Letters Patent is hereby corrected as shown below:

Title Page, line (73) Assignee: PROCAL
Langres, France

Title Page, after "Primary Examiner":

Attorney, Agent, or Firm--Hoffman, Wasson & Gitler

Signed and Sealed this

Eleventh Day of August, 1992

*Attest:*

DOUGLAS B. COMER

*Attesting Officer*     *Acting Commissioner of Patents and Trademarks*